(12) United States Patent
Park

(10) Patent No.: US 8,891,191 B1
(45) Date of Patent: Nov. 18, 2014

(54) DATA STORAGE DEVICE INITIALIZING READ SIGNAL GAIN TO DETECT SERVO SEED PATTERN

(71) Applicant: Western Digital Technologies, Inc., Irvine, CA (US)

(72) Inventor: Charles A. Park, Aromas, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/271,338

(22) Filed: May 6, 2014

(51) Int. Cl.
*G11B 5/09* (2006.01)
*G11B 5/596* (2006.01)

(52) U.S. Cl.
USPC .......................................... 360/53; 360/77.04

(58) Field of Classification Search
USPC ............ 360/31, 53, 72.2, 77.04, 78.09, 78.14
See application file for complete search history.

(56) References Cited

U.S. PATENT DOCUMENTS

| | | | |
|---|---|---|---|
| 4,589,037 A * | 5/1986 | Jen et al. ..................... | 360/77.04 |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,507,450 B1 | 1/2003 | Elliott | |
| 6,534,936 B2 | 3/2003 | Messenger et al. | |
| 6,538,839 B1 | 3/2003 | Ryan | |

(Continued)

*Primary Examiner* — Nabil Hindi

(57) ABSTRACT

A data storage device is disclosed comprising a disk comprising at least one servo seed pattern, and a head actuated over the disk. An amplitude measurement is generated based on a read signal emanating from the head while reading the disk. A number of times the amplitude measurement exceeds a first threshold is first counted during a first revolution of the disk, and a number of times the amplitude measurement exceeds the first threshold is second counted during a second revolution of the disk. The servo seed pattern is detected based on the first count and the second count.

18 Claims, 6 Drawing Sheets

(56) References Cited

U.S. PATENT DOCUMENTS

| | | | |
|---|---|---|---|
| 6,545,835 B1 | 4/2003 | Codilian et al. |
| 6,549,359 B1 | 4/2003 | Bennett et al. |
| 6,549,361 B1 | 4/2003 | Bennett et al. |
| 6,556,525 B1 | 4/2003 | Takiguchi |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |

(56) References Cited

U.S. PATENT DOCUMENTS

| | | |
|---|---|---|
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,667,911 B2 | 2/2010 | Lau |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,768,732 B2 | 8/2010 | Ozdemir |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,944,638 B1 | 5/2011 | Cheung et al. |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,223,448 B1 | 7/2012 | Haw et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

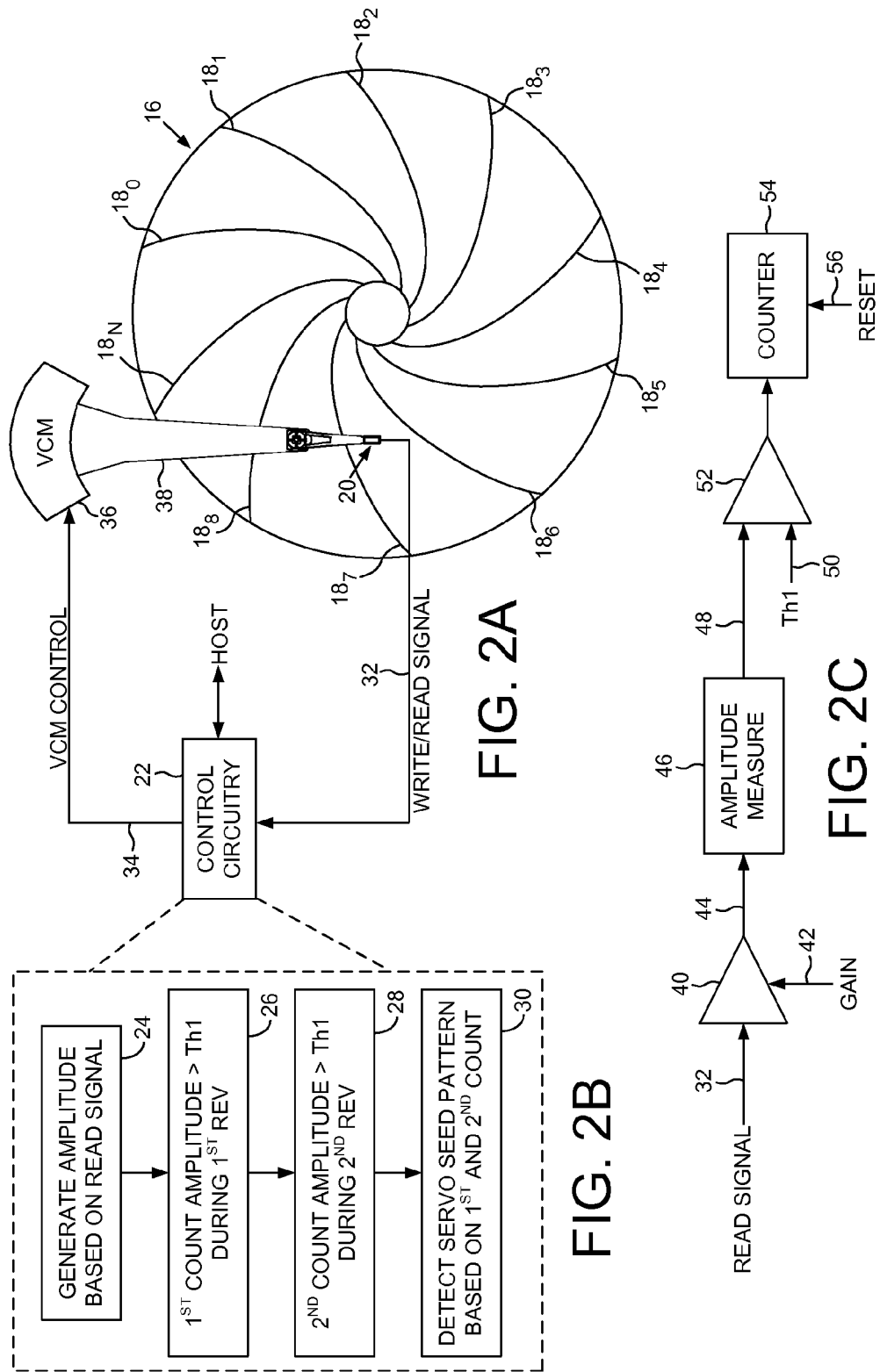

DATA STORAGE DEVICE INITIALIZING READ SIGNAL GAIN TO DETECT SERVO SEED PATTERN

BACKGROUND

When manufacturing a data storage device such as a disk drive, concentric servo sectors $6_0$-$6_N$ are written to a disk 2 which define a plurality of radially-spaced, concentric servo tracks 6 as shown in the prior art disk format of FIG. 1. A plurality of concentric data tracks are defined relative to the servo tracks 4, wherein the data tracks may have the same or a different radial density (tracks per inch (TPI)) than the servo tracks 4. Each servo sector (e.g., servo sector $6_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target data track during a seek operation, and the servo bursts 14 are processed to maintain the head over a centerline of the target data track while writing or reading data during a tracking operation.

In the past, external servo writers have been used to write the concentric servo sectors $6_0$-$6_N$ to the disk surface during manufacturing. External servo writers employ extremely accurate head positioning mechanics, such as a laser interferometer, to ensure the concentric servo sectors $6_0$-$6_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, U.S. Pat. No. 5,668,679 teaches a disk drive which performs a self-servo writing operation by writing a plurality of spiral servo tracks to the disk which are then processed to write the concentric servo sectors along a circular path. Each spiral servo track is written to the disk as a high frequency signal (with missing bits), wherein the position error signal (PES) for tracking is generated relative to time shifts in the detected location of the spiral servo tracks. The read signal is rectified and low pass filtered to generate a triangular envelope signal representing a spiral servo track crossing, wherein the location of the spiral servo track is detected by detecting a peak in the triangular envelope signal relative to a clock synchronized to the rotation of the disk.

BRIEF DESCRIPTION OF THE DRAWINGS

FIG. 2A shows a data storage device in the form of a disk drive according to an embodiment comprising a head actuated over a disk comprising a servo seed pattern.

FIG. 2B is a flow diagram according to an embodiment wherein a number of times an amplitude measurement exceeds a first threshold is first counted during a first revolution of the disk and second counted during a second revolution of the disk, wherein the servo seed pattern is detected based on the first and second count.

FIG. 2C shows control circuitry according to an embodiment for counting a number of times the amplitude measurement exceeds a first threshold.

DETAILED DESCRIPTION OF EMBODIMENTS OF THE INVENTION

Figure 1:
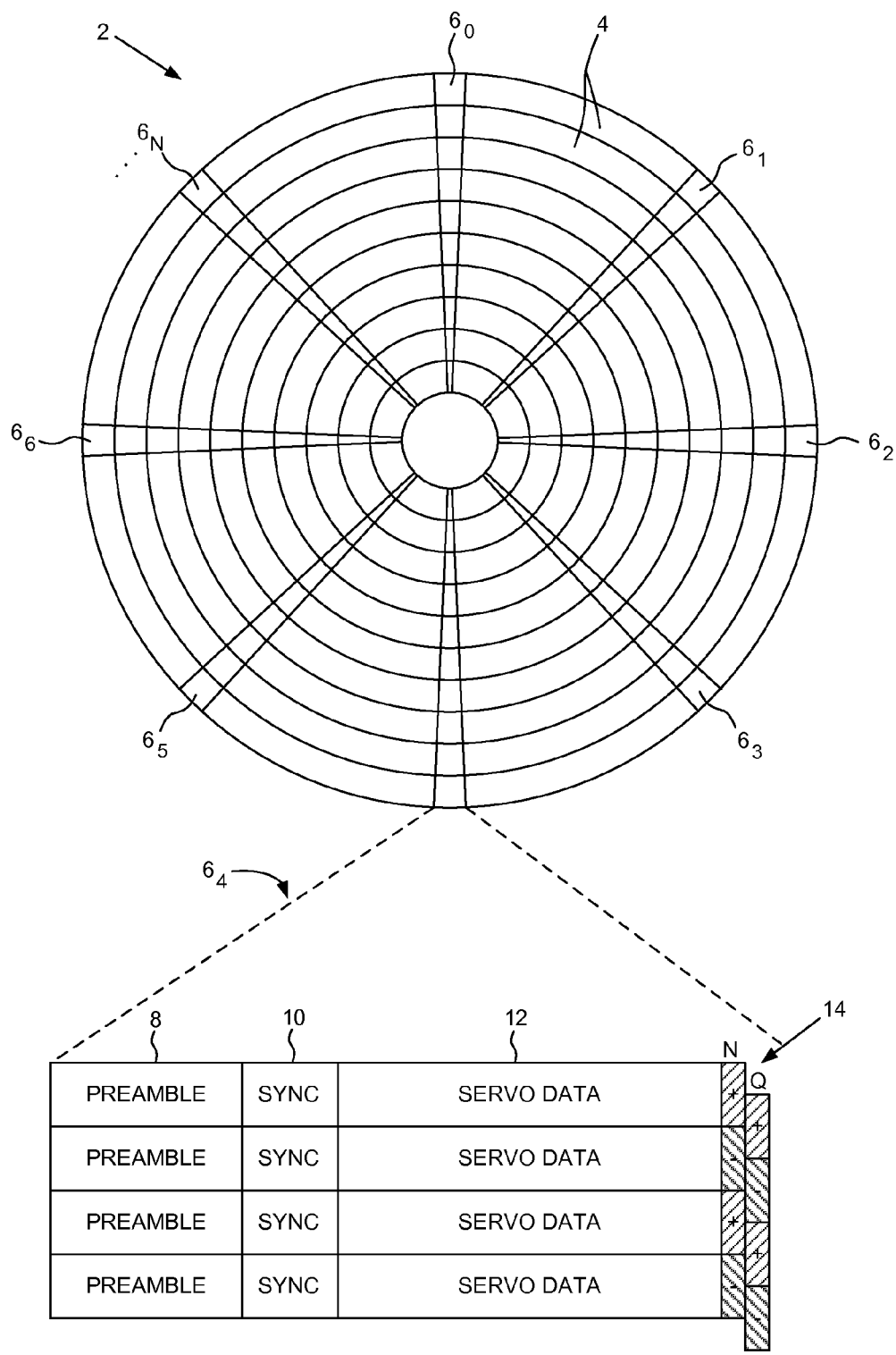
FIG. 1 shows a prior art disk format comprising a plurality of servo tracks defined by servo sectors.

FIG. 2A shows a data storage device in the form of a disk drive according to an embodiment comprising a disk 16 comprising at least one servo seed pattern $18_0$, and a head 20 actuated over the disk 16. The disk drive further comprises control circuitry 22 configured to execute the flow diagram of FIG. 2B wherein an amplitude measurement is generated based on a read signal emanating from the head while reading the disk (block 24). A number of times the amplitude measurement exceeds a first threshold is first counted during a first revolution of the disk (block 26), and a number of times the amplitude measurement exceeds the first threshold is second counted during a second revolution of the disk (block 28). The servo seed pattern is detected based on the first count and the second count (block 30).

In the embodiment of FIG. 2A, the control circuitry 22 processes a read signal 32 emanating from the head 20 to detect the servo seed patterns $18_0$-$18_N$, and in one embodiment, generate a control signal 34 applied to a voice coil motor (VCM) 36 which rotates an actuator arm 38 about a pivot in order to actuate the head 20 radially over the disk 16. For example, in one embodiment the control circuitry 22 may actuate the head 20 over the disk 16 based on the servo seed patterns $18_0$-$18_N$ in order to write servo sectors that define concentric servo tracks such as shown in FIG. 1. At the beginning of the servo writing process, the control circuitry 22 may need to calibrate an initial gain for the read signal (e.g., determine a noise floor) as well as determine the initial circumferential location of the servo seed patterns $18_0$-$18_N$ relative to the head 20.

FIG. 2C shows control circuitry according to an embodiment wherein an amplifier 40 amplifies the read signal 32 based on a configurable gain control setting 42. Block 46 measures an amplitude of the amplified read signal 44 using any suitable technique which may include sampling, rectifying, averaging, filtering, and/or other suitable signal processing technique. The measured amplitude 48 is compared to a first threshold Th1 50 at comparator 52, and counter 54 counts the number of times the measured amplitude 48 exceeds the first threshold Th1 50 over a revolution of the disk, wherein in one embodiment the counter 54 is reset by reset signal 56 after each revolution.

Figure 3A:
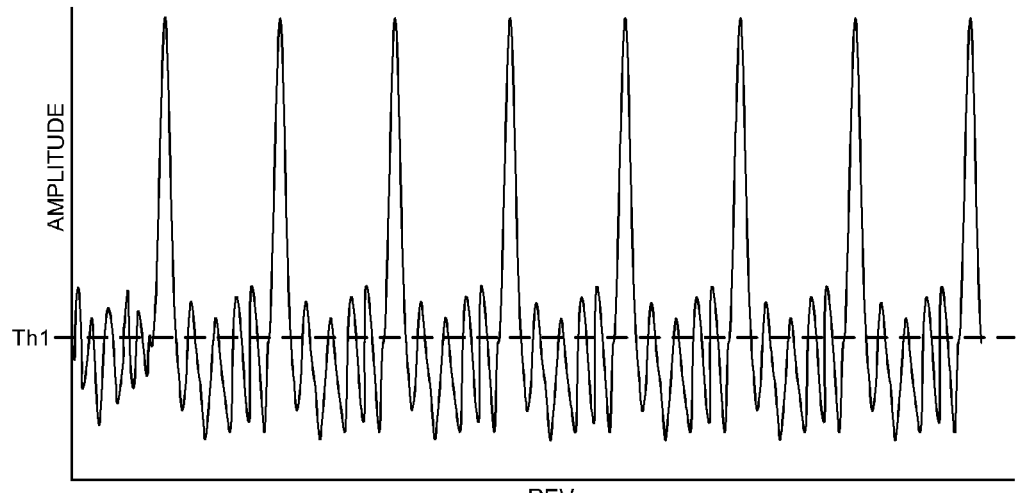
FIG. 3A illustrates an embodiment wherein noise in the amplitude measurement exceeds the first threshold.
Figure 3B:
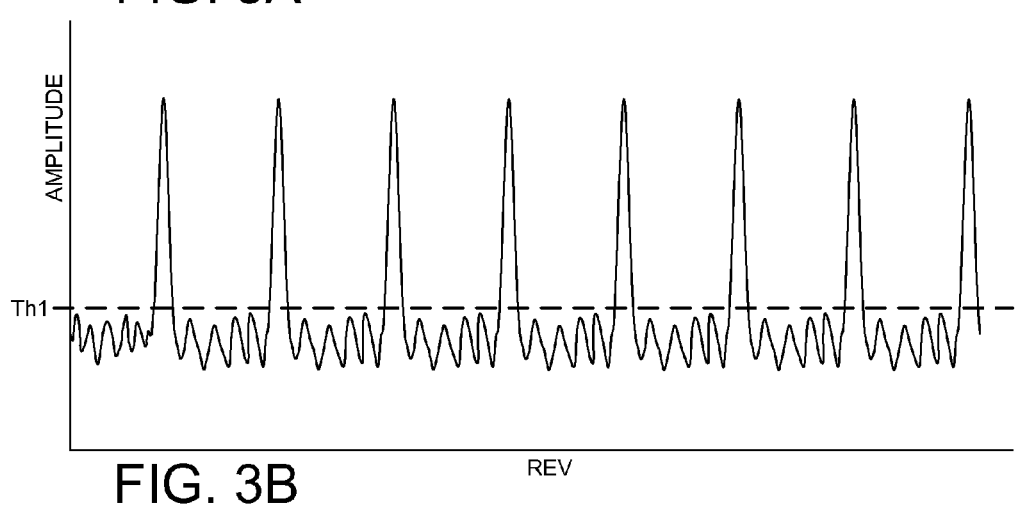
FIG. 3B illustrates an embodiment wherein a gain of the read signal is decreased until the noise in the amplitude measurement falls below the first threshold.
Figure 3C:
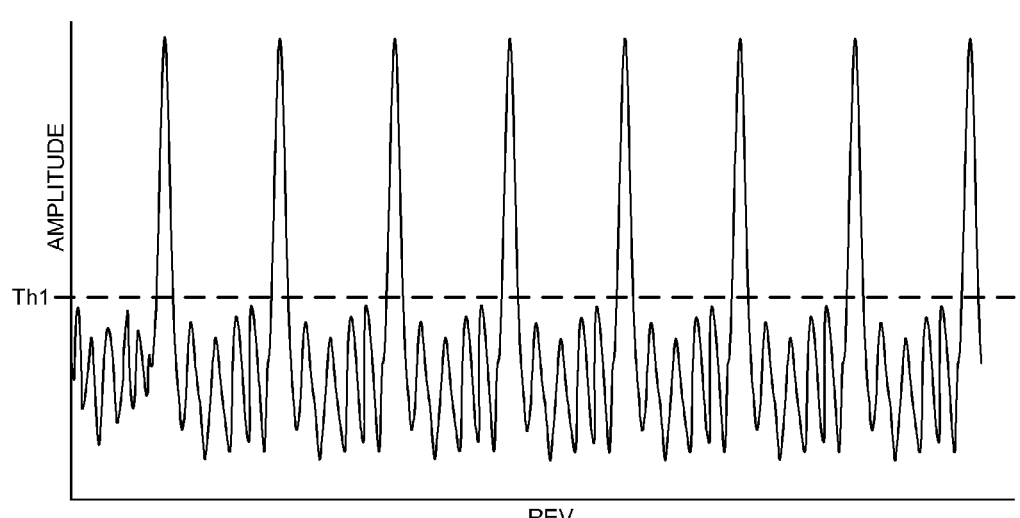
FIG. 3C illustrates an embodiment wherein the first threshold is increased until the noise in the amplitude measurement falls below the first threshold.

FIG. 3A shows an example amplitude measurement over a revolution of the disk which illustrates operation of the control circuitry shown in FIG. 2C. In the example of FIG. 3A, the gain of amplifier 40 is initialized to a high setting such that the noise in the amplitude measurement randomly exceeds the first threshold Th1 over a revolution of the disk. That is, due to the random nature of the noise in the amplitude measurement, the value of the counter 54 after a first revolution of the disk will be different from the value of the counter 54 after a second revolution of the disk. FIG. 3B illustrates an embodiment wherein if the gain of the amplifier 40 is reduced, the noise in the amplitude measurement eventually falls below the first threshold Th1 leaving only the spikes in the amplitude measurement due to the head crossing the servo seed patterns $18_0$-$18_N$. Accordingly, when the noise falls below the first threshold Th1, the delta in the counter value between a first and second revolution will fall below a second threshold (or be zero). In an alternative embodiment, instead of adjusting the gain of the amplifier 40, the first threshold Th1 is adjusted relative to the noise in the amplitude measurement. FIG. 3C illustrates an example of this embodiment wherein the first threshold Th1 is incrementally increased until the delta in the counter values between a first and second revolution falls below a second threshold indicating that the counter is driven by the spikes in the amplitude measurement corresponding to the periodic servo seed patterns $18_0$-$18_N$ rather than by the noise. In one embodiment, after adjusting the first threshold Th1 as shown in FIG. 3C, the control circuitry may make a corresponding adjustment to the gain of the read signal amplifier 40.

Figure 4:
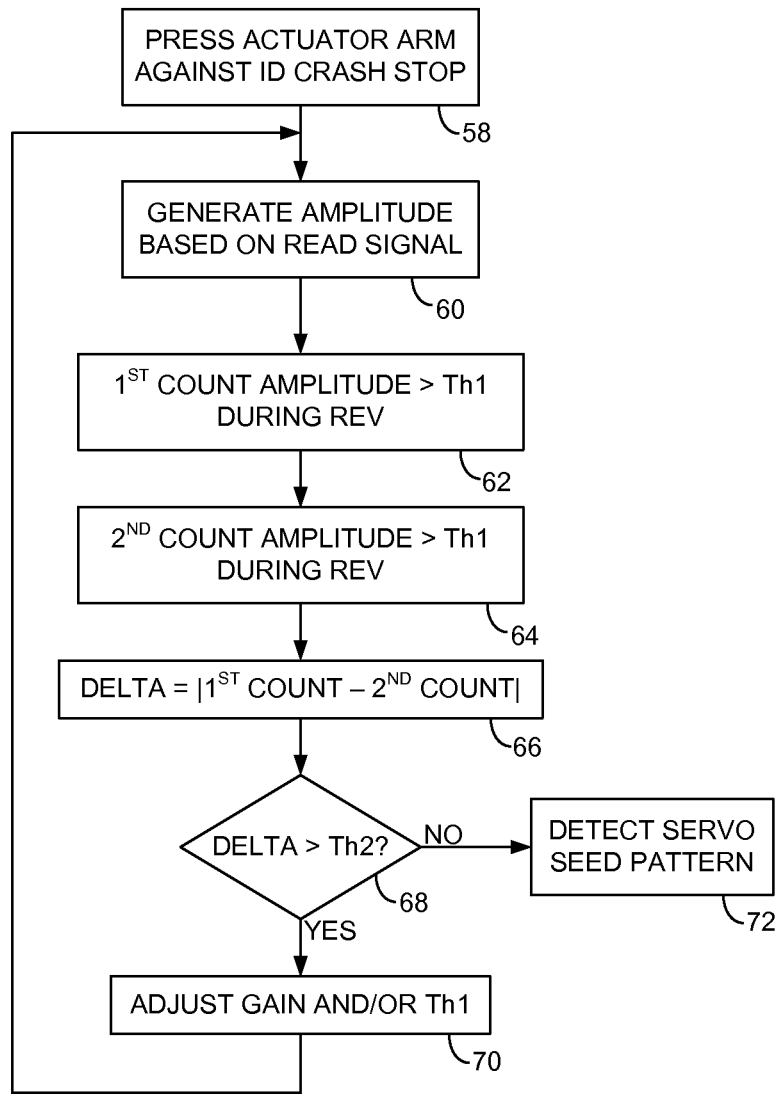
FIG. 4 is a flow diagram according to an embodiment wherein the first and second counts are re-measured until a delta between the counts falls below a second threshold.

FIG. 4 is a flow diagram according to an embodiment wherein when initially detecting the servo seed patterns, the control circuitry 22 controls the VCM 36 to press the actuator arm 38 against an inner diameter (ID) crash stop (not shown), thereby maintaining the head 20 at a substantially constant radial position as the disk rotates (block 58). An amplitude measurement is generated based on the read signal (block 60), and the control circuitry first counts a number of times the amplitude measurement exceeds the first threshold Th1 during a first revolution of the disk (block 62), and counts a number of times the amplitude measurement exceeds the first threshold Th1 during a second revolution of the disk (block 64). A delta between the first and second counts is generated (block 66), and the delta is compared to a second threshold Th2 (block 68). If the delta is greater than the second threshold Th2, then the gain of the amplifier 40 and/or the first threshold Th1 is adjusted (block 70) and the flow diagram is repeated from block 60. This process is repeated until the delta falls below the second threshold Th2 at block 68, after which the counter values may be used to detect the servo seed patterns (block 72), such as by reading the servo seed patterns using the final gain adjustment.

Figure 5A:
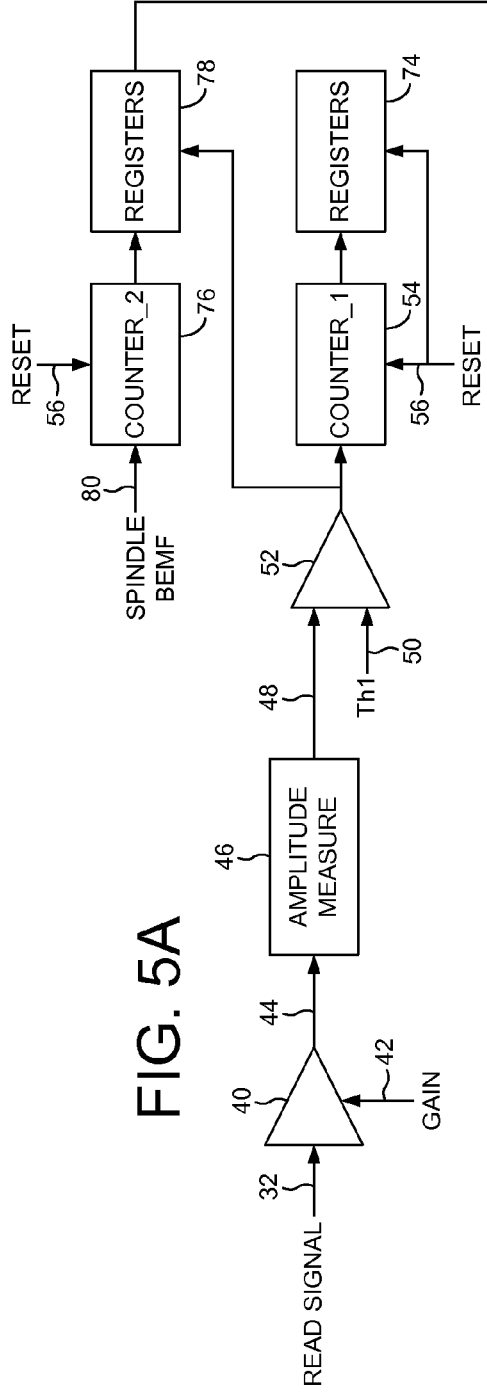
FIG. 5A shows control circuitry according to an embodiment wherein after adjusting the gain of the read signal a servo seed pattern window is generated based on the rotation angle of the disk when the amplitude measurement exceeds the first threshold.
Figure 5B:
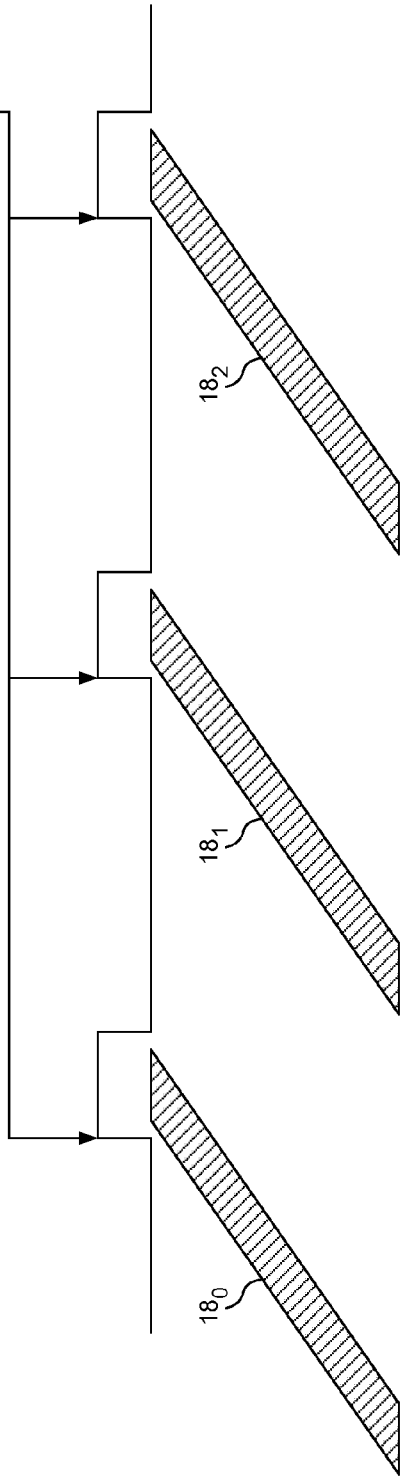
FIG. 5B illustrates an embodiment wherein the servo seed pattern window is opened to facilitate detecting the servo seed pattern on the disk.

In one embodiment, the control circuitry 22 is further configured to detect the servo seed patterns by opening a servo seed pattern window based on when the amplitude measurement exceeds the first threshold relative to a rotation angle of the disk. FIGS. 5A and 5B illustrate an example of this embodiment, wherein FIG. 5A shows control circuitry similar to FIG. 2C. A first set of registers 74 store the output of the first counter 54 after each revolution of the disk in order to generate the delta at block 66 of FIG. 4. A second counter 76 is clocked at a frequency based on the rotation speed of the disk, which in one embodiment is a clock 80 generated by the zero-crossings in a back electromotive force (BEMF) voltage generated by a spindle motor that rotates the disk. When the amplitude measurement 48 exceeds the first threshold Th1 50 at comparator 52 due to the head crossing a servo seed pattern, the value of the second counter 76 is stored in a corresponding register of a bank of registers 78. That is, each time the comparator 52 detects a servo seed pattern, the corresponding rotation angle of the disk is tracked by the second counter 76 is stored in a register 78. In one embodiment, the bank of registers 78 stores the second counter values generated over each revolution of the disk, which are then used to open a servo seed pattern window at the rotation angle where the register values are substantially the same across multiple revolutions (thereby ignoring noise that may trigger a false detection of a servo seed pattern). In one embodiment, the correlation of the detected servo seed patterns by the comparator 52 across multiple disk revolutions may also be used to adjust the gain and/or first threshold Th1 in the flow diagram of FIG. 4. For example, the gain and/or first threshold Th1 may be adjusted until the correlation of the detected servo seed patterns across multiple revolutions exceeds a threshold.

FIG. 5B illustrates an embodiment wherein the servo seed pattern window is opened based on the counter values stored in registers 78. As the disk rotates and the rotation angle changes as determined by the spindle BEMF clock 80, when the second counter 76 reaches a value previously stored in the registers 78, the servo seed pattern window is opened and the read signal processed to demodulate the servo seed pattern (e.g., to generate a PES for servoing the head). Once the servo seed patterns $18_0$-$18_N$ have been detected at a particular radial location (e.g., at the ID crash stop), the servo seed pattern windows may be adjusted as the head is moved radially over the disk in order to track variations in the circumferential location of the servo seed patterns.

Figure 6:
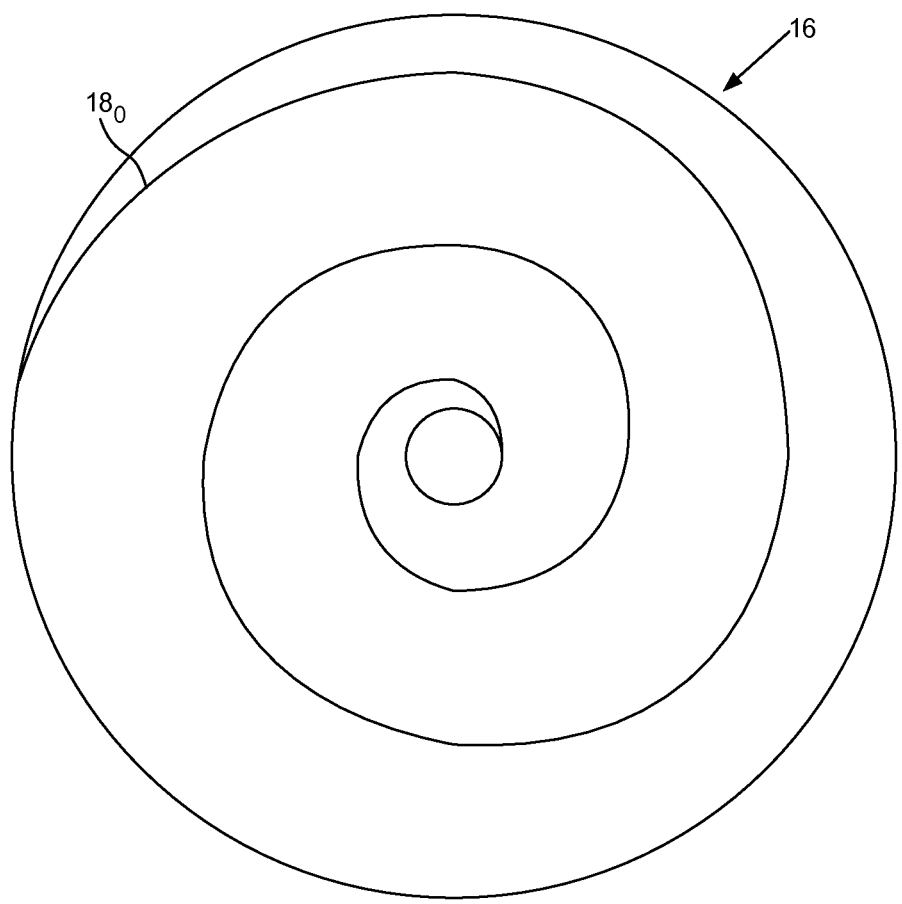
FIG. 6 shows an embodiment wherein the servo seed pattern comprises a spiral track that spans multiple disk revolutions according to an embodiment.

Any suitable servo seed pattern may be recorded on the disk 16, and in one embodiment the area on the disk between the servo seed patterns may be erased (AC or DC) or comprise random magnetic transitions. In the embodiment of FIG. 2A, the servo seed pattern comprises a spiral track that spans a partial revolution of the disk 16. For example, the spiral track may comprise a high frequency signal (periodically interrupted by sync marks) that is written while moving the head radially across the disk 16 at a predetermined velocity. FIG. 6 shows an embodiment wherein each spiral track shown in FIG. 2A may be written over multiple disk revolutions by decreasing the radial velocity of the head relative to the rotation speed of the disk when writing each spiral track.

In one embodiment, the servo seed patterns $18_0$-$18_N$ may be self-written to the disk 16 by the control circuitry 22 internal to the disk drive. An example embodiment for writing servo seed patterns is disclosed in U.S. Pat. No. 8,634,283 entitled "DISK DRIVE PERFORMING IN-DRIVE SPIRAL TRACK WRITING" the disclosure of which is incorporated herein by reference. In another embodiment, the servo seed patterns $18_0$-$18_N$ may be written to the disk 16 using an external servo writer prior to installing the disk into the disk drive. In either case, it may be necessary to calibrate the gain of the read signal amplifier 40 prior to detecting the servo seed patterns $18_0$-$18_N$ as described above.

In the embodiment of FIG. 3B, the gain of the amplifier 40 (FIG. 2C) is decreased until the delta between the counter values falls below the second threshold at block 68 of FIG. 4. In another embodiment, the gain of the amplifier 40 may be initialized to a low value and then increased until the delta between the counter values exceeds the second threshold. In another similar embodiment, the first threshold Th1 may be initialized to a high value and then decreased at block 68 of FIG. 4 until the delta between the counter values exceeds the second threshold. In general, these embodiments attempt to discover the noise floor in the amplitude measurement so that the servo seed patterns may be accurately detected when initially synchronizing to the servo seed patterns.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
  a disk comprising at least one servo seed pattern;
  a head actuated over the disk; and
  control circuitry configured to:
    generate an amplitude measurement based on a read signal emanating from the head while reading the disk;
    first count a number of times the amplitude measurement exceeds a first threshold during a first revolution of the disk;
    second count a number of times the amplitude measurement exceeds the first threshold during a second revolution of the disk; and
    detect the servo seed pattern based on the first count and the second count.

2. The data storage device as recited in claim 1, wherein when a first delta between the first count and the second count is greater than a second threshold, the control circuitry is further configured to:
  adjust a gain of the read signal; and
  detect the servo seed pattern based on the adjusted gain of the read signal.

3. The data storage device as recited in claim 2, wherein prior to detecting the servo seed pattern the control circuitry is further configured to:
  third count a number of times the amplitude measurement exceeds the first threshold during a third revolution of the disk;
  fourth count a number of times the amplitude measurement exceeds the first threshold during a fourth revolution of the disk; and
  validate the adjusted gain of the read signal when a second delta between the third count and the fourth count is less than the second threshold.

4. The data storage device as recited in claim 3, wherein the control circuitry is further configured to continue adjusting the gain of the read signal until the delta is less than the second threshold.

5. The data storage device as recited in claim 1, wherein when a first delta between the first count and the second count is greater than a second threshold, the control circuitry is further configured to:
  adjust the first threshold; and
  detect the servo seed pattern based on the adjusted first threshold.

6. The data storage device as recited in claim 5, wherein prior to detecting the servo seed pattern the control circuitry is further configured to:
  third count a number of times the amplitude measurement exceeds the first threshold during a third revolution of the disk;
  fourth count a number of times the amplitude measurement exceeds the first threshold during a fourth revolution of the disk; and
  validate the adjusted first threshold when a second delta between the third count and the fourth count is less than the second threshold.

7. The data storage device as recited in claim 6, wherein the control circuitry is further configured to continue adjusting the first threshold until the delta is less than the second threshold.

8. The data storage device as recited in claim 1, wherein the control circuitry is further configured to detect the servo seed pattern by opening a servo seed pattern window based on when the amplitude measurement exceeds the first threshold relative to a rotation angle of the disk.

9. The data storage device as recited in claim 8, wherein the control circuitry is further configured to open the servo seed pattern window based on when the amplitude measurement exceeds the first threshold during the first disk revolution and when the amplitude measurement exceeds the first threshold during the second disk revolution at the same rotation angle of the disk.

10. A method of operating a data storage device, the method comprising:
    generating an amplitude measurement based on a read signal emanating from a head while reading a disk;
    first counting a number of times the amplitude measurement exceeds a first threshold during a first revolution of the disk;
    second counting a number of times the amplitude measurement exceeds the first threshold during a second revolution of the disk; and
    detecting a servo seed pattern on the disk based on the first count and the second count.

11. The method as recited in claim 10, wherein when a first delta between the first count and the second count is greater than a second threshold, the method further comprises:
    adjusting a gain of the read signal; and
    detecting the servo seed pattern based on the adjusted gain of the read signal.

12. The method as recited in claim 11, wherein prior to detecting the servo seed pattern the method further comprises:
    third counting a number of times the amplitude measurement exceeds the first threshold during a third revolution of the disk;
    fourth counting a number of times the amplitude measurement exceeds the first threshold during a fourth revolution of the disk; and
    validating the adjusted gain of the read signal when a second delta between the third count and the fourth count is less than the second threshold.

13. The method as recited in claim 12, further comprising to continue adjusting the gain of the read signal until the delta is less than the second threshold.

14. The method as recited in claim 10, wherein when a first delta between the first count and the second count is greater than a second threshold, the method further comprises:
    adjusting the first threshold; and
    detecting the servo seed pattern based on the adjusted first threshold.

15. The method as recited in claim 14, wherein prior to detecting the servo seed pattern the method further comprises:
    third counting a number of times the amplitude measurement exceeds the first threshold during a third revolution of the disk;
    fourth counting a number of times the amplitude measurement exceeds the first threshold during a fourth revolution of the disk; and
    validating the adjusted first threshold when a second delta between the third count and the fourth count is less than the second threshold.

16. The method as recited in claim 15, further comprising to continue adjusting the first threshold until the delta is less than the second threshold.

17. The method as recited in claim 10, further comprising detecting the servo seed pattern by opening a servo seed pattern window based on when the amplitude measurement exceeds the first threshold relative to a rotation angle of the disk.

18. The method as recited in claim 17, further comprising opening the servo seed pattern window based on when the amplitude measurement exceeds the first threshold during the first disk revolution and when the amplitude measurement exceeds the first threshold during the second disk revolution at the same rotation angle of the disk.

\* \* \* \* \*